United States Patent
Uehara et al.

(10) Patent No.: US 7,270,602 B2
(45) Date of Patent: Sep. 18, 2007

(54) KEYBOARD GAME PROGRAM AND KEYBOARD GAME DEVICE

(75) Inventors: Masatoshi Uehara, Tokyo (JP); Kazunori Hideya, Tokyo (JP); Taisei Nomura, Tokyo (JP); Hitomi Terada, Tokyo (JP)

(73) Assignee: Konami Corporation, Tokyo (JP)

( * ) Notice: Subject to any disclaimer, the term of this patent is extended or adjusted under 35 U.S.C. 154(b) by 545 days.

(21) Appl. No.: 10/474,057

(22) PCT Filed: Nov. 21, 2002

(86) PCT No.: PCT/JP02/12158

§ 371 (c)(1),
(2), (4) Date: Oct. 6, 2003

(87) PCT Pub. No.: WO03/070341

PCT Pub. Date: Aug. 28, 2003

(65) Prior Publication Data

US 2004/0132518 A1    Jul. 8, 2004

(30) Foreign Application Priority Data

Feb. 22, 2002    (JP)    ............... 2002-046659

(51) Int. Cl.
*A63F 9/24* (2006.01)
*G09B 15/02* (2006.01)

(52) U.S. Cl. ........................ 463/7; 84/477 R

(58) Field of Classification Search ............ 463/7, 463/37, 47, 36; 84/719, 744, 326, 376 K, 84/423 R, 446, 447, 477 R, 478, 479 A, 84/470 R, 645, 464 A; 446/132; 345/168, 345/773

See application file for complete search history.

(56) References Cited

U.S. PATENT DOCUMENTS

| 4,254,686 | A | * | 3/1981 | Leonard | ...................... 84/481 |
| 5,886,273 | A | * | 3/1999 | Haruyama | ................... 84/478 |
| 5,971,635 | A | * | 10/1999 | Wise | .......................... 400/473 |

(Continued)

FOREIGN PATENT DOCUMENTS

GB    2352549    1/2001

(Continued)

OTHER PUBLICATIONS

Supplemental European Search Report Relating to EP 02806860.

*Primary Examiner*—Robert E Pezzuto
(74) *Attorney, Agent, or Firm*—Duane Morris, LLP

(57) ABSTRACT

A game program KGP for playing a game by operating a keyboard connected with a computer in response to a picture displayed on a monitor 9 has a procedure for detecting and computing number of keys (S2 through S9), for detecting and computing number of keys of the keyboard 17 connected with a game machine body, and a procedure for setting key set (S9 through S13), for setting one or more key sets on the keyboard according to the number of keys if the detected number of keys is a predetermined number of keys or more. Then, people can easily enjoy the keyboard game program with only a general purpose keyboard, and it is not necessary to specifically prepare a dedicated controller, thereby providing the game program usable for various purposes.

12 Claims, 6 Drawing Sheets

U.S. PATENT DOCUMENTS

| | | | |
|---|---|---|---|
| 6,011,210 A * | 1/2000 | Haruyama et al. | 84/470 R |
| 6,025,550 A * | 2/2000 | Kato | 84/464 A |
| 6,066,791 A * | 5/2000 | Renard et al. | 84/477 R |
| 6,066,795 A * | 5/2000 | Hara | 84/645 |
| 6,380,470 B1 * | 4/2002 | Fujiwara et al. | 84/470 R |
| 6,388,181 B2 * | 5/2002 | Moe | 84/477 R |
| 6,751,439 B2 * | 6/2004 | Tice et al. | 434/350 |
| 6,821,203 B2 * | 11/2004 | Suga et al. | 463/7 |
| 6,915,488 B2 * | 7/2005 | Omori et al. | 715/773 |
| 2002/0013166 A1 | 1/2002 | Yoshitomi | |
| 2003/0151628 A1 * | 8/2003 | Salter | 345/773 |
| 2005/0078090 A1 * | 4/2005 | Glatzer et al. | 345/168 |

FOREIGN PATENT DOCUMENTS

| | | |
|---|---|---|
| JP | 3015862 | 12/1999 |
| JP | 3015862 B2 | 12/1999 |
| JP | 2001-92770 A | 4/2001 |
| JP | 2001-246155 A | 9/2001 |
| JP | 62-052626 A | 8/2006 |

* cited by examiner

US 7,270,602 B2

KEYBOARD GAME PROGRAM AND KEYBOARD GAME DEVICE

TECHNICAL FIELD

This invention relates to keyboard game program and a keyboard game machine for operating a keyboard connected with a game machine according to signs for instructing operation which are displayed on a display so as to vie with one another in musical performance.

BACKGROUND ART

In order to enjoy such a keyboard game, a keyboard dedicated for the keyboard game has been connected with a game machine in the past.

But, a person can not enjoy the game as long as the person does not buy the keyboard dedicated for the game even if the person already has a general purpose keyboard.

Under this situation, the developments of keyboard game program usable with a general purpose keyboard have been desired. But, some kinds of the general purpose keyboards are widely different in number of keys from the other ones. So, mere connection between a general purpose keyboard and a game machine can not exhibit a special characteristic of the general purpose keyboard connected.

Then, the developments of the keyboard game program for recognizing number of keys of a general purpose keyboard connected with a game machine on program side and for setting keys according to the number of keys recognized, and a keyboard game machine for attaining such aims have been desired.

DISCLOSURE OF INVENTION

The invention is keyboard game program for enjoying a predetermined game by operating a keyboard connected with a computer as a controller by a player in response to a picture controlled to be displayed on a monitor, the keyboard being comprised of a plurality of keys, comprising:

the keyboard game program being program for getting the computer to execute the following procedures:

a procedure for detecting and computing number of keys (such as steps S2 through S9 of the keyboard configuration program GKP), for detecting and computing number of the keys of the keyboard connected with the computer; and a procedure for setting key set (such as steps S9 through S13 of the keyboard configuration program GKP), for setting one or more key sets necessary for execution of the game on the keyboard according to the number of keys detected and computed if the number of keys of the keyboard detected and computed by the procedure for detecting and computing number of keys is a predetermined number of keys or more.

According to this aspect of the invention, the procedure for detecting and computing number of keys (such as steps S2 through S9 of the keyboard configuration program GKP) detects and computes the number of keys of the keyboard connected with the computer, and the procedure for setting key set (such as steps S9 through S13 of the keyboard configuration program GKP) sets one or more key sets on the keyboard according to the detected and computed number of keys of the keyboard of the connected keyboard is a predetermined number of keys or more, so that the game program can recognize the number of keys of the keyboard connected with the game machine, and the keys can be set on the keyboard according to the recognized number of keys. As the result, people can easily enjoy the keyboard game program with the general purpose keyboard, and it is not necessary to specifically prepare a dedicated controller, thereby providing the game program usable for various kinds of purposes.

Besides, another aspect of the invention is the keyboard game program, wherein the keyboard game program is program for getting the computer to further execute a procedure for recognition of general purpose keyboard, for judging as to whether or not the connected keyboard is a general purpose keyboard, and for controlling to execute the procedure for detecting and computing number of keys when judging connection with the general purpose keyboard.

Besides, an another aspect of the invention is the keyboard game program, wherein the procedure for recognition of general purpose keyboard judges as to whether or not the keyboard connected with the computer is a general purpose keyboard on the basis of a device identification signal outputted from the keyboard.

Besides, an another aspect of the invention is the keyboard game program, wherein the keyboard game program is program for getting the computer to further execute a procedure for displaying for acceleration of detecting operation, for displaying a keyboard picture on the monitor and for inviting the player to operate a predetermined key on the keyboard, and the procedure for detecting and computing number of keys detects and computes number of the keys of the keyboard connected with a game machine body from a signal inputted into the game machine body when the player operates the keyboard in response to representation displayed on the monitor on the basis of the procedure for displaying for acceleration of detecting operation.

According to this aspect of the invention, the procedure for displaying for acceleration of detecting operation displays the keyboard picture on the monitor, and invites the player to operate a predetermined key on the keyboard. Then, the number of keys necessary for execution of the game program can be detected mainly by the game program even if the player does not recognize the number of keys of the keyboard connected with the game machine body by himself or herself. As the result, speedy setting of the key sets is possible, and people can immediately start the musical performance game on the basis of the game program, which is the original object of the player.

Besides, an another aspect of the invention is the keyboard game program, wherein the procedure for displaying for acceleration of detecting operation has a procedure for displaying for instruction of operation position, for instructing a position of the key to be operated by the player with an image in the keyboard picture displayed on the monitor (such as the arrow AR or a blinking sign of FIG. 2).

According to this aspect of the invention, the procedure for displaying for instruction of operation position instructs the position of the key to be operated by the player with an image (such as, the arrow AR or a blinking sign of FIG. 2) in the keyboard picture displayed on the monitor, so that the player can immediately recognize the operation to be done next with visual sense, and a speedy setting of the key set is possible. As the result, people can immediately start the musical performance game on the basis of the game program, which is the original object of the player.

Besides, an another aspect of the invention is the keyboard game program, wherein number of the keys comprising the key set which is set by the procedure for setting key set is a total number of keys as playing keys necessary for playing (for instance, twenty four keys) and keys as auxiliary keys to be used as auxiliary keys necessary for setting relating to playing (for instance, four keys) or more.

According to this aspect of the invention, the number of keys set by the procedure for setting key set is a total number of keys as playing keys necessary for playing (for instance, twenty four keys) and keys as auxiliary keys to be used as auxiliary keys necessary for setting relating to playing (for instance, four keys) or more, so that the auxiliary keys which are provided for the dedicated controller excluding keys for playing can be allotted on the keys of the keyboard such that the general purpose keyboard can have almost the same function as the dedicated controller.

Besides, an another aspect of the invention is the keyboard game program, wherein the procedure for setting key set sets two sets of the key sets on the keyboard if the number of the keys of the keyboard which is detected and computed by the procedure for detecting and computing number of keys is a predetermined number of keys (for instance, sixty one keys) or more.

According to this aspect of the invention, the procedure for setting key set sets two sets of the key sets on the keyboard if the number of the keys of the keyboard which is detected and computed by the procedure for detecting and computing number of keys is a predetermined number of keys (for instance, sixty one keys) or more, so that both players can simultaneously play, and the key sets can be set, making the best use of the strong point of the keyboard having bigger number of octaves than the dedicated controller.

Besides, an another aspect of the invention is keyboard game machine for enjoying a predetermined game by operating a keyboard connected with a computer as a controller by a player in response to a picture controlled to be displayed on a monitor, the keyboard being comprised of a plurality of keys, comprising:

the keyboard game machine having means for detecting and computing number of keys, for detecting and computing number of the keys of the keyboard connected with the computer and means for setting key set, for setting one or more key sets necessary for execution of the game on the keyboard according to the number of keys detected and computed if the number of keys of the keyboard detected and computed by the means for detecting and computing number of keys is a predetermined number of keys or more.

Besides, an another aspect of the invention is keyboard game machine for enjoying a predetermined game by operating a keyboard connected with a computer as a controller by a player in response to a picture controlled to be displayed on a monitor, the keyboard being comprised of a plurality of keys, comprising:

the keyboard game machine having a machine for detecting and computing number of keys, for detecting and computing number of the keys of the keyboard connected with the computer, and a machine for setting key set, for setting one or more key sets necessary for execution of the game on the keyboard according to the number of keys detected and computed if the number of keys of the keyboard detected and computed by the machine for detecting and computing number of keys is a predetermined number of keys or more.

BEST MODE FOR CARRYING OUT THE INVENTION

An embodiment of the present invention will now be explained hereinafter, referring to appended drawings.

Figure 1:
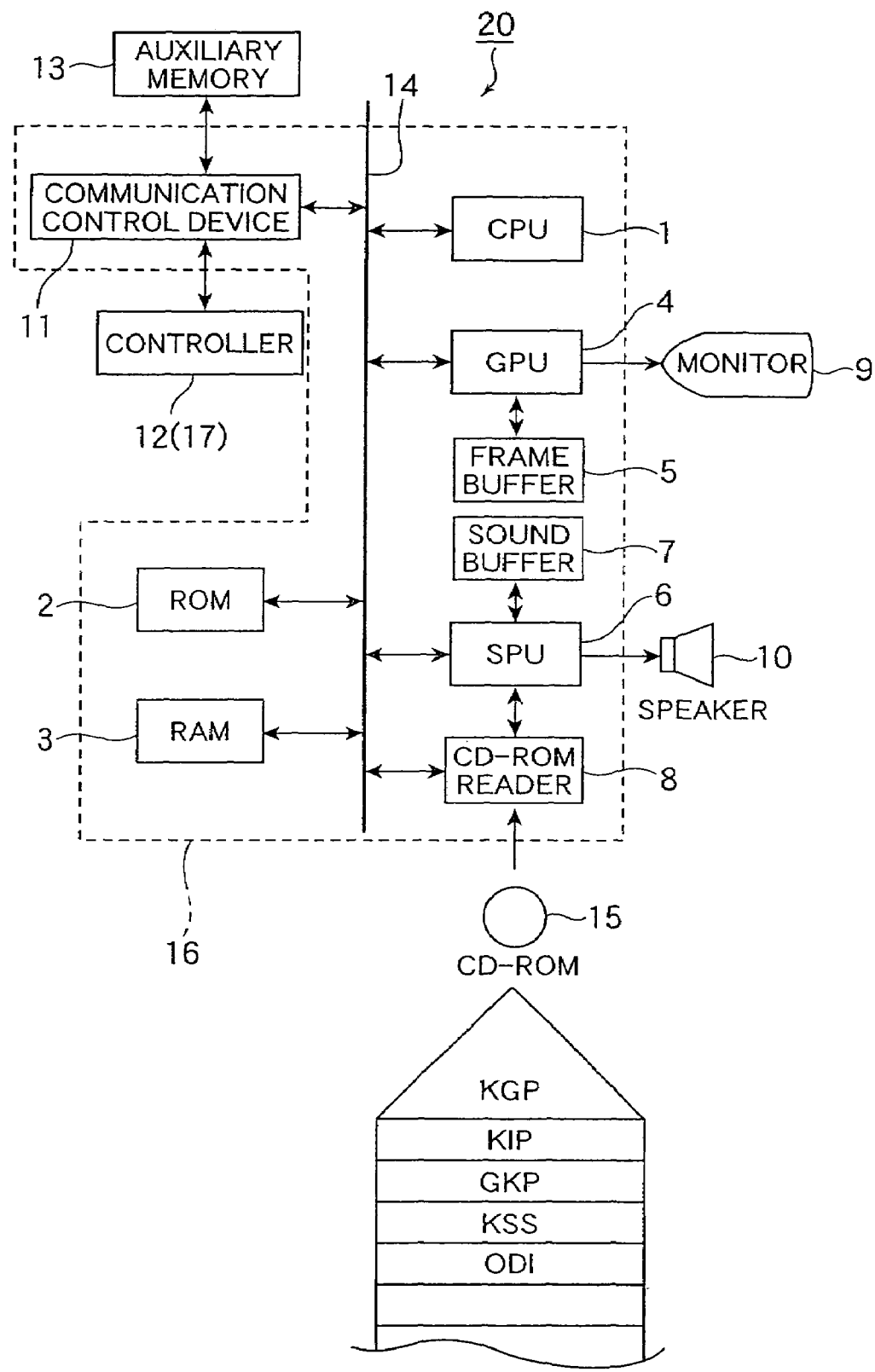
FIG. 1 is a block diagram of a game machine for home use to which the present invention is applied.

A game machine 20 is for executing a predetermined game according to program for a game, such as a keyboard game, which is stored in a CD-ROM 15 as a storage medium, as shown in FIG. 1. The game machine 20 has a CPU 1, main body of which is a microprocessor, a ROM 2 and a RAM 3 which are main memories for the CPU 1, a graphics processing unit (GPU) 4 and a sound processing unit (SPU) 6 for picture processing and voice processing, and their buffers 5, 7 and a CD-ROM reader 8. An operating system as program necessary for controlling the whole actions in the game machine is written into the ROM 2. Programs and data for the game which are read out of the CD-ROM 15 as a storage medium are written into the RAM 3, if necessary. The GPU 4 receives picture data from the CPU 1 so as to write a game picture in the frame buffer 5, and converts the data of the written picture into a predetermined video replay signal and outputs the converted to a monitor 9 with predetermined timing. And, the SPU 6 replays data of voice or sound which is read out the CD-ROM 15 and registered in the sound buffer 7, or the sound source data so as to output from a speaker 10. The CD-ROM reader 8 reads programs and data which are registered in the CD-ROM 15 according to an instruction from the CPU 1, and outputs signals corresponding to the read contents. The CD-ROM 15 has the programs and data necessary for execution of the game therein. Generally speaking, the monitor 9 is a television receiver for home use and the speaker 10 is a built-in speaker of the television receiver.

And, a communication control device 11 is connected with the CPU 1 through a bus 14, and a controller 12 for executing keyboard game program so as to enjoy musical performance, such as a dedicated keyboard and a general purpose keyboard 17 owned by a player, and an auxiliary memory 13 are attachably and detachably connected with the device 11 through connection ports, such as a USB port. The controller 12 functions as an input device, and has an operation member for receiving an operation by a player. The communication control device 11 scans the state of operation of the controller 12 at constant cycles (for instance, at 1/60 cycles per second), and outputs a signal corresponding to the scanned result to the CPU 1. The CPU 1 judges the operation state of the controller 12 on the basis of the signal. A plurality of controllers 12 and auxiliary memories 13 may be connected with the communication control device 11 in parallel.

The members in the above-mentioned structure excluding the monitor 9, the speaker 10, the controller 12, the CD-ROM 15 and the auxiliary memory 13 are integrally stored in a predetermined housing so as to comprise a game machine body 16. This game machine body 16 functions as a computer.

The game to be executed according to keyboard game program KGP which is stored in the CD-ROM 15 is a so-called "sound simulation game" wherein musical performance data which is stored in the CD-ROM 15 is outputted to the speaker 10 through the SPU 6 so as to replay BGM on the basis of its musical performance data, and a player is invited to operate the controller 12, fitting to the BGM, through the monitor 9 by signs perceivable with visual sense, and the player can play musical instrument, as it were, if the player operates the controller 12 in response to such invitation, so that the BGM and proper music can overlap.

The general purpose keyboard 17 owned by the player may be also connected with the communication control device 11 as the controller 12, in place of the keyboard dedicated for execution of the keyboard game program KGP, so that people can enjoy the game by executing the keyboard game program KGP. Predetermined number of keys and predetermined control buttons which are necessary for execution of the game program are set in advance as a key set in the dedicated keyboard. So, people can enjoy the game by only connecting the dedicated keyboard with the communication control device 11 and executing the keyboard game program KGP. On the contrary, people can not enjoy the game even if the dedicated keyboard 17 is only connected with the communication control device 11 so as to execute the game program KGP in case of the general purpose keyboard 17 since number of keys necessary for execution of the game program KGP and setting of control buttons are unclear.

Figure 2:
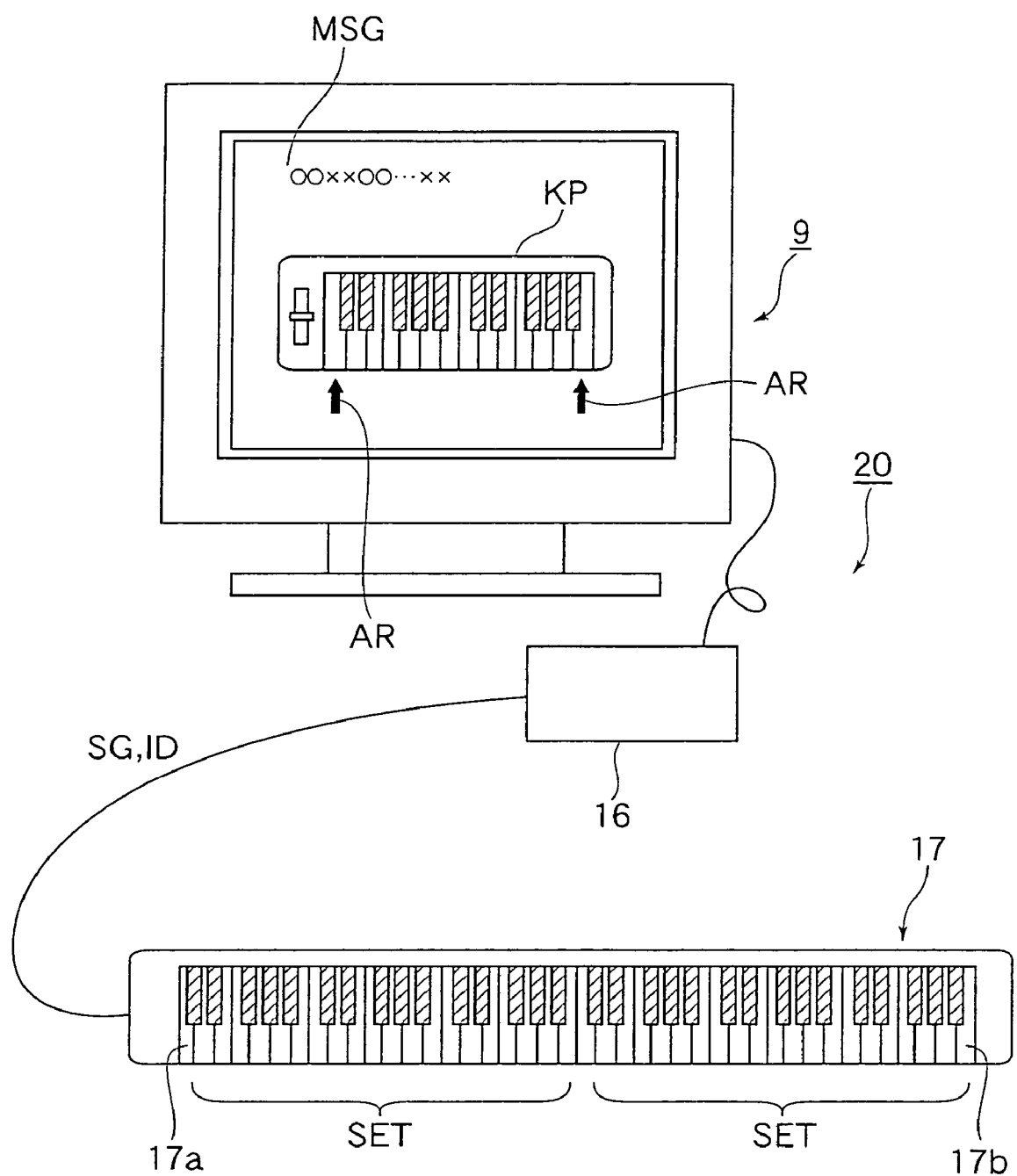
FIG. 2 is a view showing connection state between a monitor, a game machine and a general purpose keyboard when playing a keyboard game.

When connecting the generous purpose keyboard 17 such as a keyboard of "MIDI" (trademark owned by "Association of Musical Electronics Industry") owned by the player with the communication control device 11 of the game machine body 16, as shown in FIG. 2, a device identification signal ID is outputted from the generous purpose keyboard 17 to the CPU 1. Receiving this signal, the CPU 1 recognizes the connection between the communication control device 11 and the generous purpose keyboard 17 in place of the dedicated keyboard on the basis of keyboard recognition program KIP of the keyboard game program KGP.

After the CPU 1 recognizes the connection between the communication control device 11 and the general purpose keyboard 17, the CPU 1 executes setting processing necessary for execution of the keyboard game program KGP with the generous purpose keyboard 17 on the connected generous purpose keyboard 17 on the basis of general purpose keyboard configuration program GKP of the keyboard game program KGP.

Figure 3:
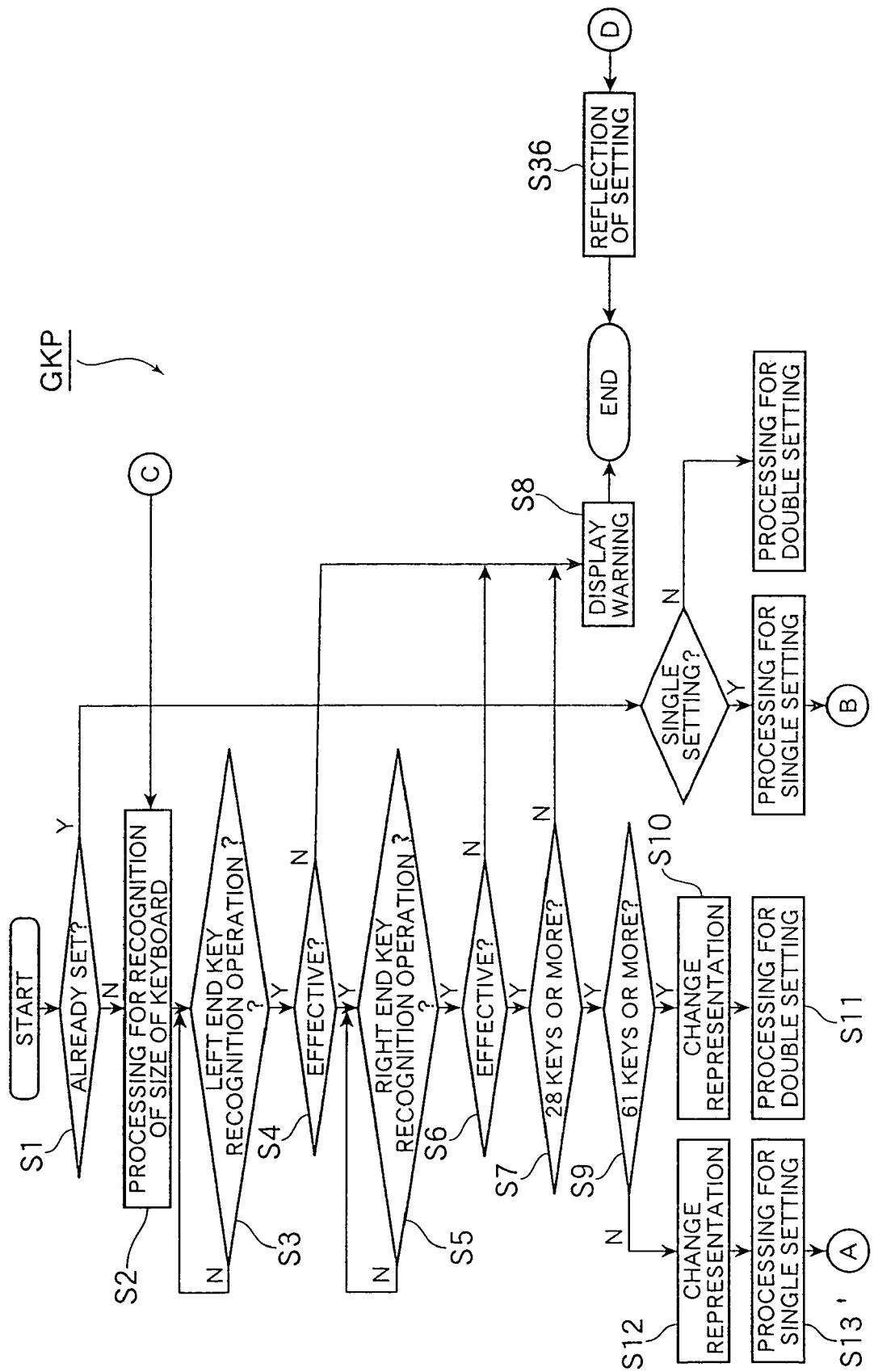
FIG. 3 is a flow chart showing general purpose keyboard configuration program.

The general purpose keyboard configuration program GKP firstly starts processing for confirming the number of keys of the connected general purpose keyboard 17 in steps S1, S2, as shown in FIG. 3. That is, the general purpose keyboard configuration program GKP executes a procedure of displaying for acceleration of detecting operation KSS of the program GKP in step S2 so as to process for displaying a keyboard picture KP which is already stored in the program GKP on the monitor 9 through the GPU 4 as shown in FIG. 2. At the same time, the general purpose keyboard configuration program GKP executes a procedure of displaying for instructing operation position (ODI) for instructing a position of a key to be operated by a player, that is, the position corresponding to the key of the most left side of the keyboard image KP on the monitor 9 with an image, such as an arrow AR or a blinking sign in order to obtain data necessary for computing processing for confirmation of number of keys.

Besides, the program executes such processing that message MSG such as "press the most left side key" is displayed on the monitor 9, or is given with voice through the speaker 10 or the like. At the same time, the program executes the processing for inviting the player to press the most left side key of the general purpose keyboard 17 connected by the player.

Watching the image displayed on the monitor 9, the player presses a corresponding key of the general purpose keyboard 17 connected with the game machine body 16, that is, a key 17a of the most left side. Then, a signal SG corresponding to the key 17a of the most left side is outputted from the general purpose keyboard 17, and the keyboard configuration program GKP recognizes the pressing of the key 17a in steps S3 and S4.

Subsequently, the general purpose keyboard configuration program GKP executes the above-mentioned procedure for displaying for instruction of operation position KSS, again so that a portion of the key on the most right side of the keyboard image KP as shown in FIG. 2 is instructed with the arrow AR or a blinking sign and the message MSG such as "press the key on the most right side" is displayed on the monitor 9. Then, the player is invited to press the key on the most right side of the general purpose keyboard 17 connected by the player.

Watching the image displayed on the monitor 9, the player presses the corresponding key of the general purpose keyboard 17 connected with the game machine body 16 by the player, that is, a key 17b of the most right side. Then, the signal SG corresponding to the key 17b of the most right side is outputted from the general purpose keyboard 17, and the keyboard configuration program GKP recognizes the pressing of the key 17b in steps S5 and S6.

The program enters into step S8 if the CPU 1 can not recognize the signal SG, and proper warning sentence is displayed on the monitor 9 so as to finish the general purpose keyboard configuration program GKP.

When the CPU 1 detects the pressing operation of the keys 17a, 17b of both ends of the general purpose keyboard 17 by the player with the signal SG, the keyboard configuration program GKP enters into step S7, and judges as to whether or not the number of keys of the general purpose keyboard 17 connected by the player is the minimum number of keys necessary for execution of the game program KGP or more, that is, twenty eight (28) keys or more. If the number of keys is smaller than twenty eight, the program enters into step S8 since the game program KGP can not be executed, and proper warning sentence is displayed so as to finish the keyboard configuration program GKP. The number of keys of the general purpose keyboard 17 can be easily obtained by computing on the basis of the signals SG, SG from the keys 17a and 17b of both ends.

The minimum number of keys (twenty eight keys) is comprised of two octaves of keys (twenty four keys) as playing keys necessary for playing and keys as auxiliary keys to be used as auxiliary keys necessary for setting relating to playing (four keys). This minimum number of keys is optional, so it is not limited to twenty eight (28).

Subsequently, the keyboard configuration program GKP enters into step S9, and judges as to which number of key sets SETs, each set being comprised of the minimum twenty eight keys necessary for execution of the game program KGP, can be set for the general purpose keyboard 17 connected by the player. That is, a single or double key sets SETs through which the game program KGP can be simultaneously executed with the general purpose keyboard 17, can be set in the keyboard configuration program GKP. In a single setting, only a set of key set SET, comprised of minimum twenty eight keys, is set on the general purpose keyboard 17. And, in a double setting, two sets of key sets SETs, each being comprised of minimum twenty eight keys, are set on the general purpose keyboard 17, so that both players can simultaneously enjoy the musical performance game with the operation of the general purpose keyboard 17. In FIG. 2, two sets of key sets SETs are set, arranged in right and left direction on the general purpose keyboard 17.

If the number of keys of the general purpose keyboard 17 connected by the player is sixty one (61) or more in step S9, the program enters into a processing for double setting for setting two sets of key sets on the general purpose keyboard 17 in step S11 via step S10. If the number of keys of the general purpose keyboard 17 connected by the player is smaller than sixty one (61), the program enters into a processing for single setting for setting a set of key set SET on the general purpose keyboard 17 in step S13 via step S12.

Figure 4:
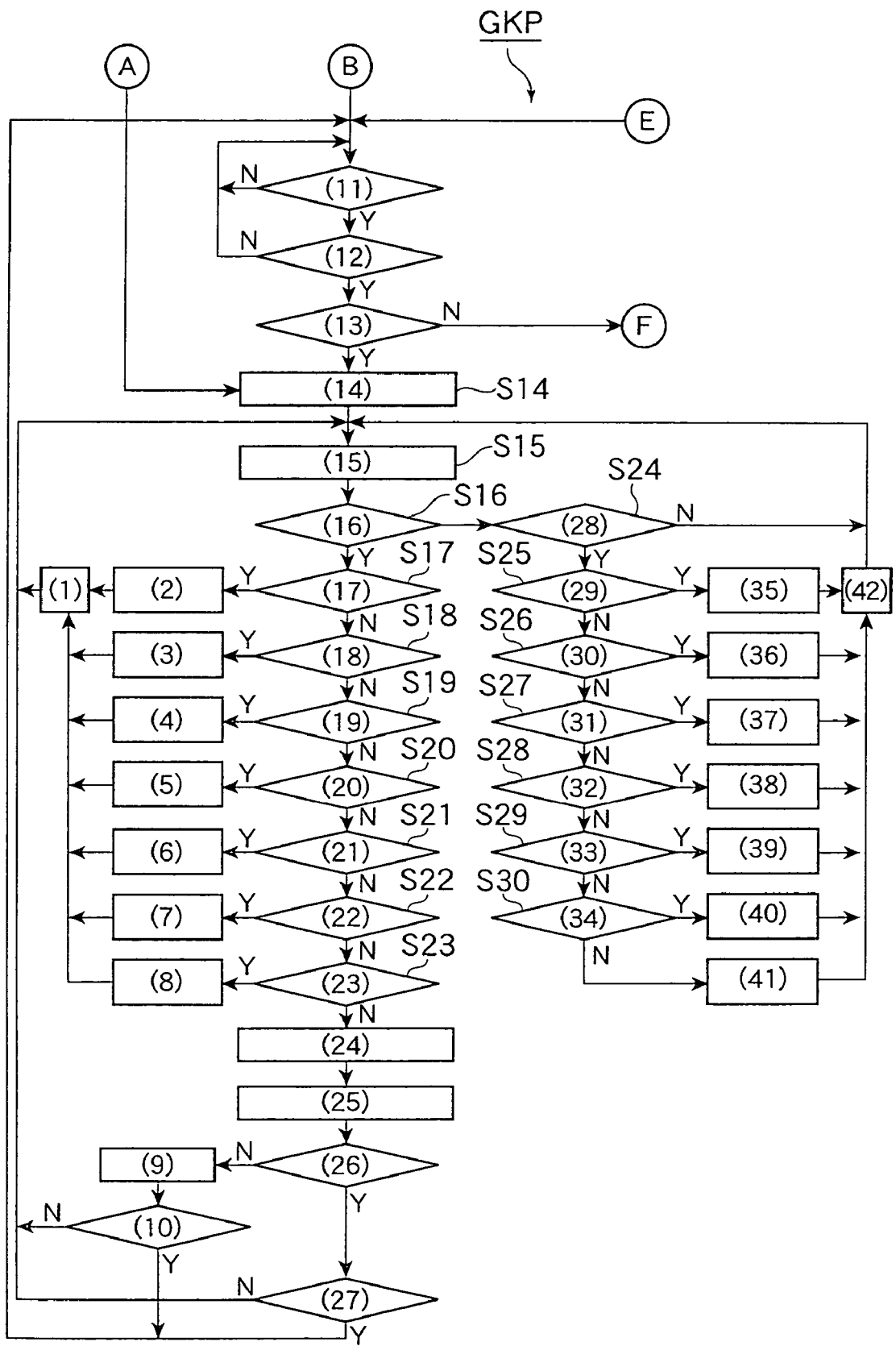
FIG. 4 is a flow chart showing general purpose keyboard configuration program.

The keyboard configuration program GKP enters into step S14 for the single setting, as shown in FIG. 4 so as to execute a processing for detailed setting on keys as shown below. In step S15, the player operates to select setting items and the program enters in step S17, and a processing for setting a position of "do" which is a standard sound of the keys, a processing for allotting keys for selecting and determining a plurality of options displayed on a scope of the monitor 9 during playing (referred to as "wheel" in FIG. 4), such keys being prepared for executing only game program KGP, which are not set on the general purpose keyboard 17 although such keys are set on an original keyboard, and a processing for allotting other control buttons, such as "start button" and "select button" are executed during steps S17 through S23.

In case of cancellation of the processing for detailed setting on keys which is once set on the keyboard, the keyboard configuration program GKP executes the processing for cancellation of setting in steps S25 through S30 via steps S16 through S24 according to inputting by the player.

Figure 6:
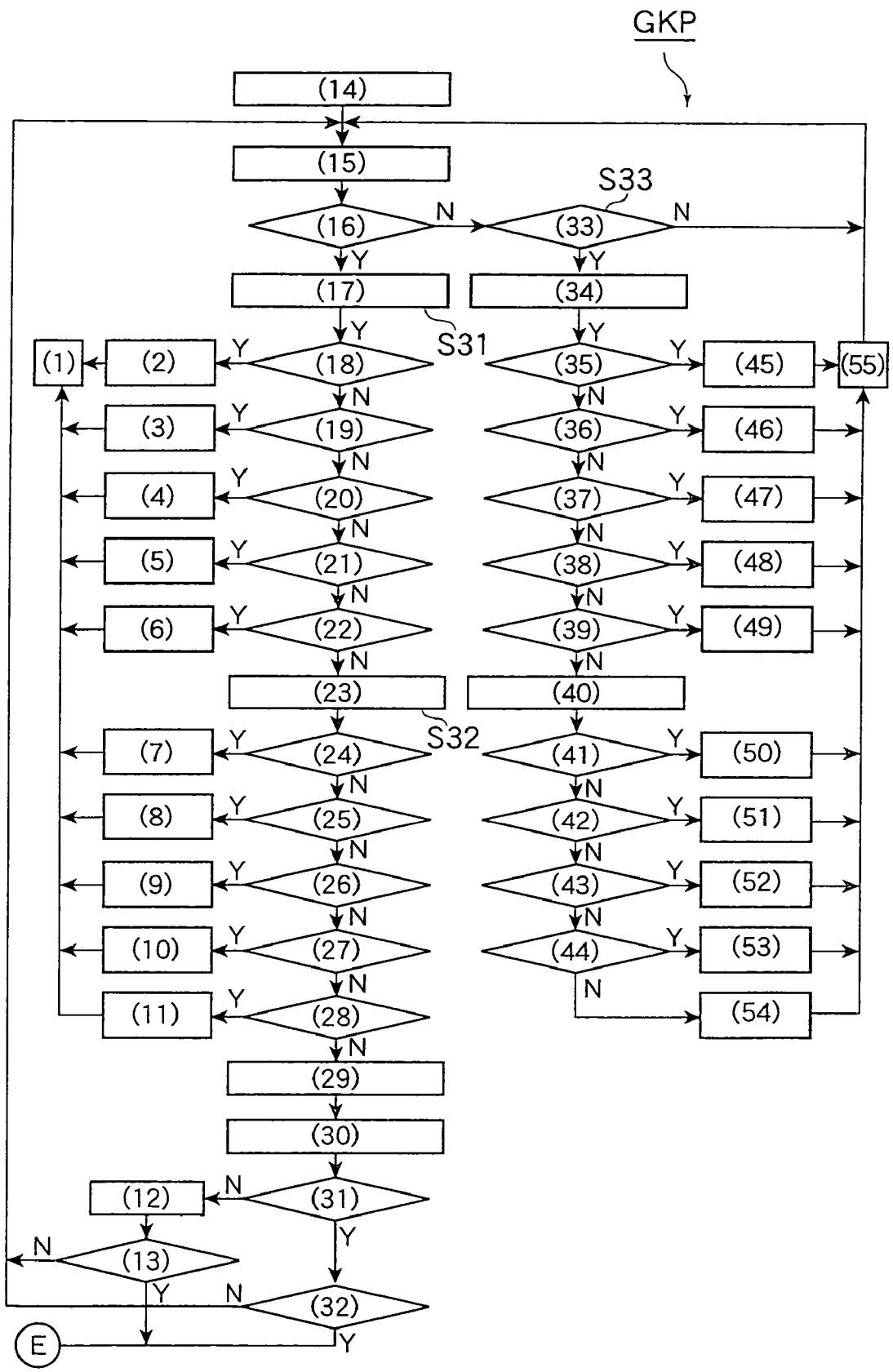
FIG. 6 is a flow chart showing general purpose keyboard configuration program.

The processing for the double setting is as shown in FIG. 6. This processing is basically similar to the processing for single setting as shown in FIG. 4. As shown in steps S31 and S32, two sets of key sets are set, so the above-mentioned processing, that is, the processing for setting a position of "do" which is a standard sound of the keys, the processing for allotting keys for selecting and determining a plurality of options displayed on a scope of the monitor 9 during playing (referred to as "wheel" in FIG. 4), such keys being prepared for executing only game program KGP, which are not set on the general purpose keyboard 17 although such keys are set on an original keyboard, and a processing for allotting other control buttons, such as "start button" and "select button" are executed for each key set. This point is similar on cancellation of setting subsequent to step S33.

Figure 5:
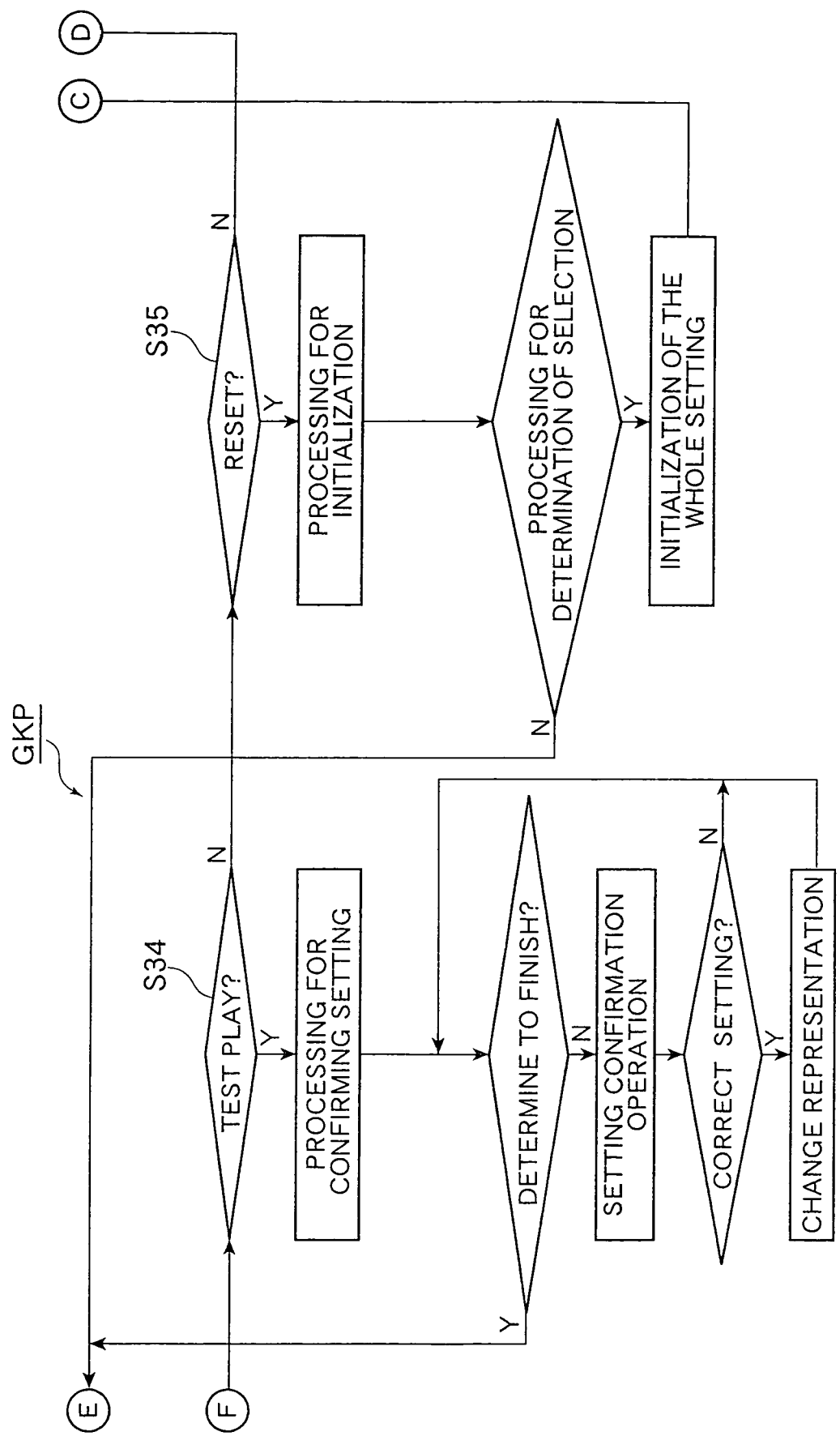
FIG. 5 is a flow chart showing general purpose keyboard configuration program.

After setting of one or two sets of key sets SETs on the general purpose keyboard 17 as shown in FIG. 2, the keyboard configuration program GKP tests for playing in step S34 as shown in FIG. 5, so that the player is invited to confirm as to whether the setting contents is correct or not.

In case of no test playing in step S34, the CPU 1 executes a processing for reflection of various kinds of setting on the key set provided on the general purpose keyboard 17 in step S36 of FIG. 3 via reset judgment of step S35, and then, the execution of the keyboard configuration program GKP finishes. After setting of one or two key sets SETs on the general purpose keyboard 17, the player presses down the key corresponding to a start button of the key set provided on the keyboard 17 so as to execute the keyboard game program KGP, and enjoys the musical performance simulation game with the operation of the key set SET provided on the general purpose keyboard 17.

In the above-mentioned keyboard game program KGP, the general purpose keyboard 17 is used as the controller 12 in addition to using of the dedicated keyboard, prepared only for the game, but the above-mentioned keyboard configuration program KGP may of course set one or more key sets on the general purpose keyboard 17 so as to use the general purpose keyboard 17 without using the dedicated keyboard.

In the above-mentioned embodiment, the CPU 1 is the game control device, and the combination of the CPU 1 and specified software comprises various kinds of means of the game control device. But, at least a part of such means may be replaced with a logical circuit.

INDUSTRIAL APPLICABILITY

According to the invention, the procedure for detecting and computing number of keys (such as steps S2 through step S9 of the keyboard configuration program GKP) detects and computes number of keys of the keyboard connected with the game machine body, and the procedure for setting key set (such as steps S9 through step S13 of the keyboard configuration program GKP) sets one or more key sets on the keyboard according to the number of keys detected and computed if the number of keys of the keyboard connected is a predetermined number of keys or more, so that the game program can recognize the number of keys of the general purpose keyboard connected with the game machine and can set keys on the general purpose keyboard according to the number of keys recognized. As the result, people can easily enjoy the keyboard game program with only a general purpose keyboard, and it is not necessary to specifically prepare a dedicated controller, thereby providing the game program usable for various purposes.

The invention claimed is:

1. A computer-implemented method for running a general purpose keyboard setting program in a keyboard game program for enjoying a predetermined game by instructing a computer to execute said keyboard game program, and being operated with a key set which is comprised of a plurality of keys which is set on a keyboard by a player according to a picture displayed on a monitor, said keyboard being connected with said computer as a controller, wherein said keyboard game program is programmed for instructing said computer to execute the following procedures:

a procedure for detecting and computing a number of keys of said keyboard connected with said computer; and a procedure for setting a key set necessary for execution of said game on said keyboard according to said number of keys detected and computed if said number of keys of said keyboard detected and computed by said procedure for detecting and computing number of keys is a predetermined number of keys or more;

wherein said procedure for setting key set has a procedure for setting two sets of said key sets on said general purpose keyboard for musical performance if said number of said keys for musical performance of said general purpose keyboard for musical performance which is detected and computed by said procedure for detecting and computing number of keys is a predetermined number of keys or more in order to arrange said two sets of key sets in a right/left direction; and wherein two players can simultaneously play said musical performance game by respectively using said two sets of key sets.

2. The computer-implemented method according to claim 1, wherein said keyboard game program is programmed for instructing said computer to further execute a procedure for recognition of a general purpose keyboard, for judging as to whether or not said connected keyboard is a general purpose keyboard, and for controlling to execute said procedure for detecting and computing said number of keys when judging connection with said general purpose keyboard.

3. The computer-implemented method according to claim 2, wherein said procedure for recognition of said general purpose keyboard judges as to whether or not said keyboard connected with said computer is a general purpose keyboard on the basis of a device identification signal outputted from said keyboard.

4. The computer-implemented method according to claim 1, wherein said keyboard setting program is programmed for instructing said computer to further execute a procedure for displaying in order to accelerate the detecting operation, said procedure for displaying being operable for displaying a keyboard picture on said monitor and for inviting said player to operate a predetermined key on said keyboard, and said procedure for detecting and computing a number of keys detects and computes a number of said keys of said keyboard connected with a computer from a signal inputted into said computer when said player operates said keyboard in response to a representation displayed on said monitor on the basis of said procedure for displaying for acceleration of detecting operation.

5. The computer-implemented method according to claim 4, wherein said procedure for displaying in order to accelerate the detecting operation has a procedure for displaying to instruct operation position, for instructing a position of said key to be operated by said player with a picture in said keyboard picture displayed on said monitor.

6. The computer-implemented method according to claim 1, wherein number of said keys comprising said key set which is set by executing said procedure for setting key set through said computer is a total number of keys as playing keys necessary for playing and keys as auxiliary keys to be used as auxiliary keys necessary for setting relating to playing or more.

7. A keyboard game machine for enjoying a predetermined game, said keyboard game machine comprising a processor executing instructions for performing a keyboard game program and being operated with a key set which is comprised of a plurality of keys which is set on a general purpose keyboard, said key set being operated by a player according to a picture controlled to be displayed on a monitor, said key set being connected with said computer as a controller, said instructions comprising:

means for detecting and computing number of keys, for detecting and computing the number of said keys of said general purpose keyboard; and means for setting key set, for setting one or more said key sets on said general purpose keyboard according to said number of keys detected and computed if said number of keys of said general purpose keyboard detected and computed by said means for detecting and computing number of keys is a predetermined number of keys or more;

wherein said means for setting key set has means for setting two sets of said key sets on said general purpose keyboard for musical performance if said number of said keys for musical performance of said general purpose keyboard for musical performance which is detected and computed by said means for detecting and computing number of keys is a predetermined number of keys or more in order to arrange said two sets of key sets in a right/left direction; and wherein two players can simultaneously play said musical performance game by respectively using said two sets of key sets.

8. The keyboard game machine of claim 7, further comprising a memory element associated with the processor, said memory element containing at least a portion of said instructions.

9. The keyboard game machine of claim 8, wherein said memory element is CD-ROM.

10. A keyboard game machine for enjoying a predetermined game, said keyboard game machine comprising a processor executing instructions comprising a keyboard game program and being operated with a key set which is comprised of a plurality of keys which is set on a general purpose keyboard, said key set being operated by a player according to a picture controlled to be displayed on a monitor, said keyboard being connected with said computer as a controller, said keyboard game machine comprising:

a unit for detecting and computing number of keys, for detecting and computing number of said keys of said general purpose keyboard connected with said computer; and a unit for setting key set, for setting one or more said key sets on said general purpose keyboard according to said number of keys detected and computed if said number of keys of said general purpose keyboard detected and computed by said unit for detecting and computing number of keys is a predetermined number of keys or more;

wherein said unit for setting key set has a unit for setting two sets of said key sets on said general purpose keyboard for musical performance if said number of said keys for musical performance of said general purpose keyboard for musical performance which is detected and computed by said unit for detecting and computing number of keys is a predetermined number of keys or more in order to arrange said two sets of key sets in a right/left direction; and wherein two players can simultaneously play said musical performance game by respectively using said two sets of key sets.

11. The keyboard game machine of claim 10, further comprising a memory element associated with the processor, said memory element storing at least a portion of said instructions.

12. The keyboard game machine of claim 11, wherein said memory element is CD-ROM.

* * * * *